United States Patent [19]
Breitenbacher et al.

[11] Patent Number: 5,676,435
[45] Date of Patent: Oct. 14, 1997

[54] ANTI-LOCK CONTROL WITH REAR BRAKE PRESSURE LIMITATION

[75] Inventors: Juergen Breitenbacher, Winterbach; Rainer Heinsohn, Tamm; Martin Borsik, Holzgerlingen; Andreas Klug, Leonberg; Hermann Kaess, Tamm; Peter Zeiner, Stuttgart, all of Germany

[73] Assignee: Robert Bosch GmbH, Stuttgart, Germany

[21] Appl. No.: 459,259

[22] Filed: Jun. 2, 1995

[30]  Foreign Application Priority Data

Jul. 9, 1994 [DE] Germany ............... 44 24 317.0

[51] Int. Cl.⁶ .................................................. B60T 8/30
[52] U.S. Cl. ................................. 303/186; 303/155
[58] Field of Search .................. 303/113.1, 113.5, 303/113.4, DIG. 3, DIG. 4, 155, 186

[56]  References Cited

U.S. PATENT DOCUMENTS 4,609,229  9/1986  Edenhofer ...................... 303/6

FOREIGN PATENT DOCUMENTS

| | | | |
|---|---|---|---|
| 3840336 | 7/1989 | Germany | 303/186 |
| 3728480 | 12/1989 | Germany . | |
| 2275869 | 11/1987 | Japan | 303/186 |
| 1293259 | 11/1989 | Japan | 303/113.5 |
| 2135413 | 8/1984 | United Kingdom . | |

*Primary Examiner*—Peter M. Poon
*Attorney, Agent, or Firm*—Felfe & Lynch

[57] ABSTRACT

Only the brake pressures at the front wheels are controlled individually. For this purpose, the speeds of rotation of the front wheels are detected. The brake pressure at the rear wheels is controlled jointly for both rear wheels and no detection of the speed of rotation is provided at the rear wheels. However, the brake line leading to the rear-wheel brakes has inserted into it a 2/2-way valve which can be moved into its shut-off position as a function of the brake-force distribution determined as a function of the loading and then holds the rear-axle brake pressure constant.

4 Claims, 3 Drawing Sheets

ANTI-LOCK CONTROL WITH REAR BRAKE PRESSURE LIMITATION

PRIOR ART 37 28 480 describes an ABS in which the brake pressures at the front wheels are controlled or regulated individually and the brake pressure at the wheels of the rear axle is set jointly for both rear wheels. Inserted into the brake line leading to the rear-axle brakes is an additional 2/2-way solenoid valve which closes at a certain vehicle deceleration and then holds the brake pressure constant at the rear-axle brakes. In the case of an ABS control operation, the 2/2-way valve is opened again. Also mentioned is the case where the modulation valve provided for pressure modulation at the rear axle in the case of ABS control, can be used to limit the pressure at the rear axle in the presence of a certain vehicle deceleration.

The object of the present invention is to improve the deceleration characteristics of a vehicle without a complex system of sensors.

SUMMARY OF THE INVENTION

The invention starts from an anti-lock control system for a four-wheel motor vehicle in which the brake pressure at the front wheels is designed to be individually controllable on the basis of the motional behavior of the front wheels. This is generally performed in order to avoid unwanted lock-up behavior of the wheels. The intention is also to provide limitation of the brake pressure necessary for braking the rear wheels. The essence of the invention is that only pressure limitation dependent on the loading of the vehicle is carried out at the brakes of the rear axle.

Given the configuration of the system in accordance with the invention, ABS control is carried out only at the front wheels. It is thus advantageously possible to dispense with the sensors for the detection of the wheel speeds at the rear axle.

In an advantageous refinement of the invention, provision is made for the pressure produced by the master brake cylinder to be recorded. The loading of the vehicle is determined from the vehicle deceleration and the pressure produced by the master brake cylinder. The only additional sensor required is advantageously therefore a sensor for the master brake cylinder pressure. This sensor can be integrated into the hydraulic unit and thus be significantly less expensive. The pressure information can advantageously be additionally employed in a known manner in the ABS algorithm. In the invention, cables leading to the rear axle are not necessary.

Despite dispensing with rear-axle sensors, the invention provides good brake-force distribution and the conventional loading-dependent pressure-limiting valve can be dispensed with.

In a further refinement, it is envisaged that the loading of the vehicle should be determined from the vehicle deceleration and the pressure produced by the master brake cylinder by means of a vehicle model.

The point of onset for the pressure limitation can be determined by means of a comparison of a value derived from the loading with the pressure produced by the master brake cylinder, whereupon a valve for pressure limitation at the rear axle is activated.

The invention is described in greater detail with

DETAILED DESCRIPTION OF THE PREFERRED EMBODIMENT

Figure 1:
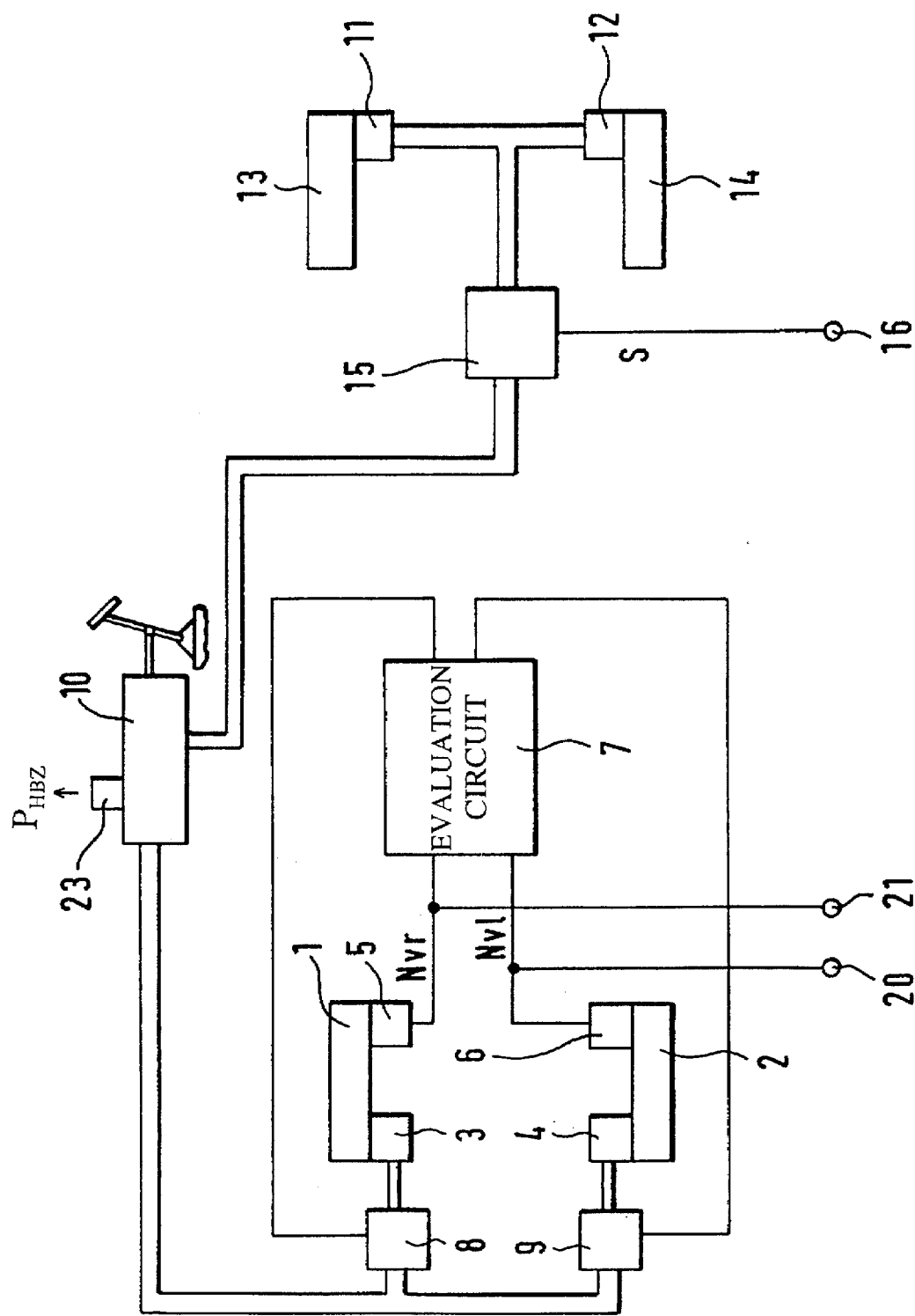
FIG. 1 shows a schematic representation of a is vehicle with a simplified ABS and rear-axle pressure limitation by a pressure-limiting valve.

In FIG. 1, the front wheels 1 and 2 of the vehicle are assigned brakes 3 and 4 and speed sensors 5 and 6. The speed sensors detect in a known manner the speed of rotation Nvr and Nvl or the angular velocity of the front wheels and the sensors 5 and 6 are connected to a conventional although here only two-channel ABS evaluation circuit 7 which, following the detection of wheel instability or a tendency to lock up, determines from the signals Nvr and Nvl from the sensors 5 and 6 control signals for the brake-pressure modulation valves 8 and 9. The brake-pressure modulation valves 8 and 9 are inserted between the master brake cylinder 10 and the front-wheel brakes 3 and 4. A sensor 23 is used to measure the master brake-cylinder pressure $P_{HBZ}$ and the further processing of the output signal of the sensor 23 is described with reference to FIG. 2. The brakes 11 and 12 of the rear wheels 13 and 14 are not included in the anti-lock control system. Inserted into the line leading from the master brake cylinder 10 to the rear-axle brakes 11 and 12 is a 2/2-way solenoid valve 15, which is usually open but can be moved into its shut-off position by means of a signal S at terminal 16.

Figure 2:
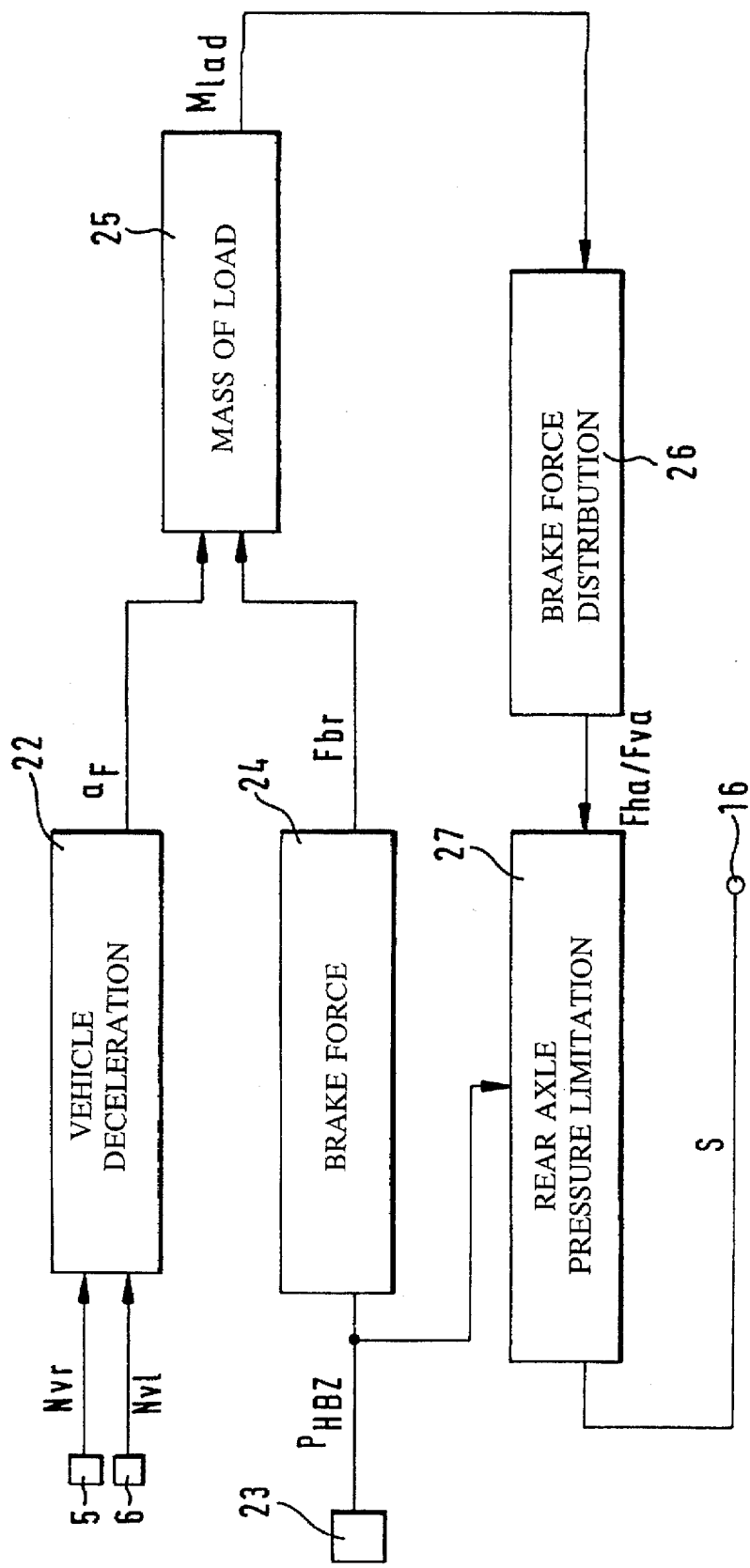
FIG. 2 shows the activation circuit or a sequence chart for the activation of the pressure-limiting valve.

The circuit or sequence chart of FIG. 2 generates the activation signal S at the terminal 16. The means or steps shown in FIG. 2 can of course be integrated into the ABS evaluation circuit 7.

The sensors 5 and 6 are also connected, by terminals 20 and 21, to a block 22, in which a vehicle deceleration signal $a_F$ is determined from the wheel-speed signals Nvr and Nvl from the sensors 5 and 6.

This is accomplished in a known manner by differentiation and suitable signal conditioning, for example by the steps described below, where Nvr is the signal from sensor 5, Nvl is the signal from sensor 6, $a_F$ is the vehicle deceleration to be determined, the index k is the current sampling instant, the index k–1 is the previous sampling instant, dT is the sampling time and s is the free variable of the Laplace transform.

1st step for determining the vehicle retardation $a_F$:

selection of the maximum wheel speed $$DF_k = \max(Nvr, Nvl)$$

2nd step:

approximate differentiation by means of difference quotient $$a = (DF_k - DF_{k-1})/dT$$

3rd step:

limitation to physically possible values $$a_F = \min(a_F, \text{maximum vehicle acceleration})$$

$$a_F = \max(a_F, \text{maximum vehicle retardation})$$

4th step:

smoothing of the signal (e.g. low-pass filtering or sliding average formation) by means of a transfer function G(s).

$$a_F(s)=a_F*G(s)$$

The master brake-cylinder pressure $P_{HBZ}$ is measured by a sensor 23 and fed to the block 24 for determination of the brake force Fbr by means of a model. This is performed in the following manner:

The entire brake force Fbr acting on the vehicle is calculated, for example, from:

$$Fbr(s)=[P_{vl}(s)*G_{vl}(s)]+[P_{vr}(s)*G_{vr}(s)]+[P_{hl}(s)*G_{hl}(s)]+[P_{hr}(s)],$$

where

Fbr is the brake force acting on the vehicle, $P_{xx}$ is the wheel brake pressure at wheel xx, $G_{xx}$ is the transfer function wheel brake pressure→brake force at wheel xx and s is the free variable of the Laplace transform.

The transfer functions $G_{xx}(s)$ contain, for example, the time-delayed response of the brakes, the stability etc. and can be simulated to any desired degree of detail in the model. In the simplest case, they degenerate to constants $C_{xx}$. If the pressure dynamics in the brake lines ($P_{xx}=P_{HZ}$) is neglected, the following may be obtained as a simple example for the determination of the brake force:

$$Fbr=P_{HZ}*[(2*C_v)+(2*C_h)]$$

where:

$P_{HZ}$ is the pressure in the master brake cylinder $C_v$ is the transfer factor for the front axle and $C_h$ is the transfer factor for the rear axle These models retain their validity only as long as the adhesion coefficient/slip maximum at the boundary is not exceeded. The relationship wheel pressure→brake force does not remain valid either, and, according to the invention, it is only possible to represent the brake-force distribution in this way outside ABS control.

The brake force Fbr determined and the vehicle deceleration $a_F$ determined are fed to block 25, which, with the aid of a vehicle model, uses them to determine the loading condition $M_{lad}$. This can be derived, for example, as described below:

In general, the vehicle deceleration follows the brake force:

$$a_F(s)*(M_{Fzg}+M_{lad})=G_{Fzg}(s)*Fbr,$$

where $N_{Fzg}$ is the mass of the unladen vehicle $M_{lad}$ is the mass of the load, $G_{Fzg}$ is the transfer function of the vehicle superstructure and s is the free variable of the Laplace transform.

If the deceleration build-up dynamics are neglected ($G_{Fzg}(s)=1$), the loading condition can be determined, for example, by $$M_{lad}=Fbr/a_F(s)-M_{Fzg}.$$

In block 26, the desired brake-force distribution Fha/Fva (ha=rear axle, va=front axle) is determined from the loading condition $M_{lad}$.

The curve of the ideal brake-force distribution is—apart from constant geometric variables—dependent only on the current loading condition. Its determination is known from the prior art (e.g. from Burckhardt/Burg: Berechnung und Rekonstruktion des Bremsverhaltens von PKW [Calculation and reconstruction of the braking behavior of passenger vehicles], Verlag INFORMATION GmbH, Kippenheim, ISBN 3-88550-025-6).

Figure 3:
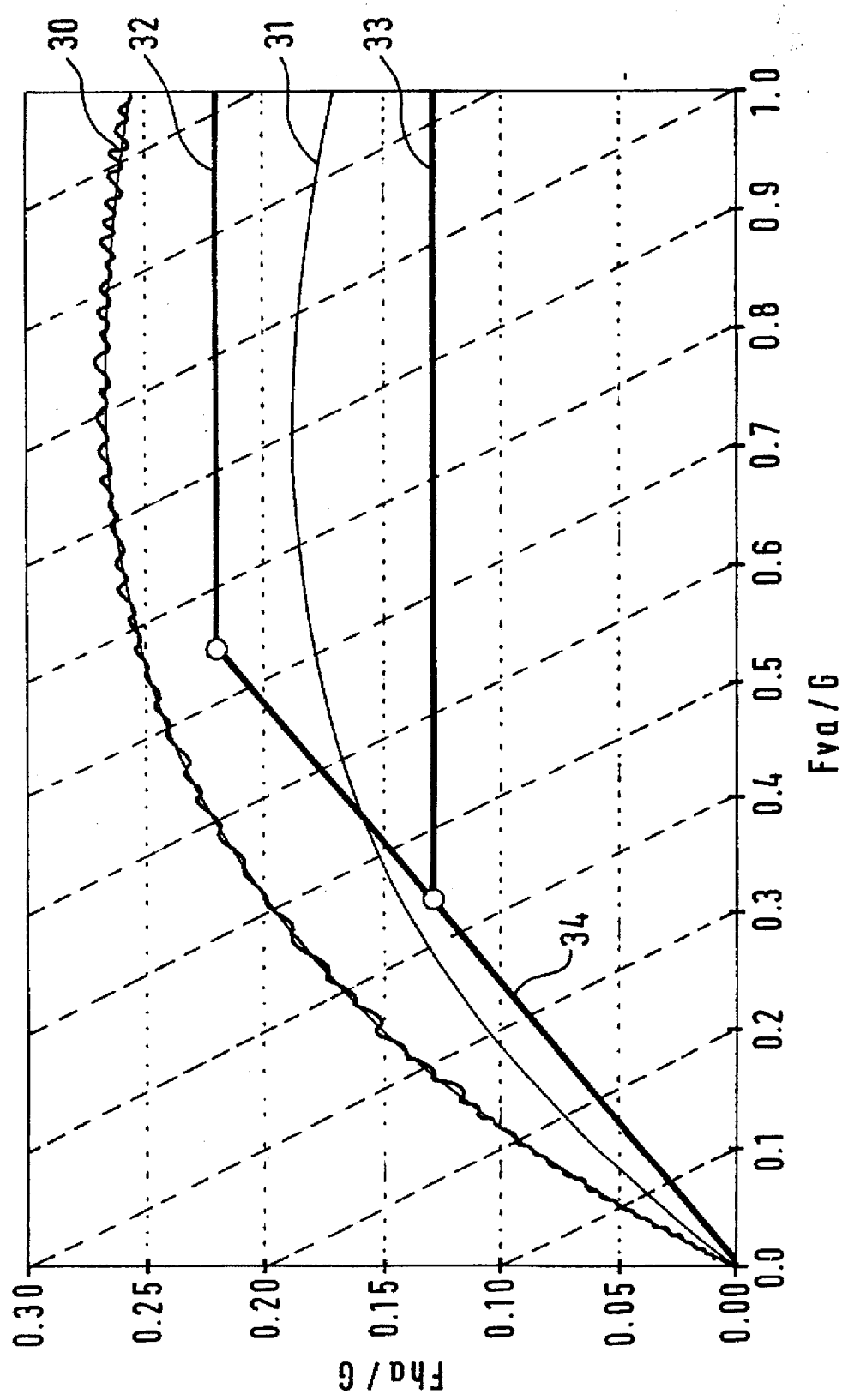
FIG. 3 shows an explanatory diagram.

In the next block 27, the desired brake-force distribution Fha/Fva is used to determine the switching point at which the valve 15 in FIG. 1 should be activated by the signal S. To explain this determination, reference is made to FIG. 3. There, 30 indicates the ideal brake-force distribution for a laden vehicle and 31 that for an empty vehicle. The aim is to achieve an approximation to the ideal curves 30 and 31 using the circuit in FIG. 2 and the valve 15. The approximation curves are denoted by 32 and 33. The idea is thus, in block 27, using the desired brake-force distribution determined to determine the associated point on the straight line 34 at which the valve 15 should be moved into the shut-off condition preventing any further pressure increase at the rear axle and hence also any further increase in the brake force Fha. Block 27 outputs the shut-off signal S to the valve 15 at its output terminal 16, thereby limiting the pressure at the rear brakes to a constant pressure limitation value which is based only on the vehicle loading $M_{lad}$.

In summary, it can be stated that a description is given of a vehicle which is equipped with an anti-lock system in which only the brake pressures at the front wheels are individually controlled. For this purpose, the speeds of rotation of the front wheels are detected. The brake pressure at the rear wheels is controlled jointly for both rear wheels and no detection of the speed of rotation is provided at the rear wheels. However, the brake line leading to the rear-wheel brakes has inserted into it a 2/2-way valve which can be moved into its shut-off position as a function of the brake-force distribution determined as a function of the loading and then holds the rear-axle brake pressure constant.

We claim:

1. Anti-lock control system for a motor vehicle having two front wheels, two rear wheels, brakes at each wheel, and a master brake cylinder, said system comprising means for determining the wheel speeds of the front wheels, means for limiting brake pressure at the front wheels based on the wheel speeds of the front wheels, means for determining the loading ($M_{lad}$) of the vehicle, means for determining a constant pressure limitation value for the brakes at the rear wheels based only on said loading ($M_{lad}$), and means for limiting brake pressure at the brakes at the rear wheels to said constant pressure limitation value.

2. Anti-lock control system as in claim 1 wherein said means for determining loading ($M_{lad}$) of the vehicle comprises means for determining vehicle deceleration ($a_F$) and means for determining pressure ($P_{HBZ}$) at said master brake cylinder.

3. Antilock control system as in claim 2 wherein said means for determining loading ($M_{lad}$) of the vehicle determines said loading from said deceleration ($a_F$) and said pressure ($P_{HBZ}$) by means of a model.

4. Antilock control system as in claim 2 further comprising means for determining a desired brake force distribution (Fha/Fva) from said vehicle loading ($M_{lad}$), said means for determining a pressure limitation for the brakes at the rear wheels comprising means for comparing said desired brake force distribution (Fha/Fva) with said pressure ($P_{HBZ}$), said means for limiting brake pressure comprising valve means interposed between said master cylinder and said rear wheels.

* * * * *

UNITED STATES PATENT AND TRADEMARK OFFICE
CERTIFICATE OF CORRECTION

PATENT NO. : 5,676,435
DATED : October 14, 1997
INVENTOR(S) : Breitenbacher et al.

It is certified that error appears in the above-identified patent and that said Letters Patent is hereby corrected as shown below:

In column 1, line 65, before "vehicle" delete -- is --.

In column 3, line 9, after the last occurrence of "(s)", insert -- *$G_{hr}(s)$ --.

In column 3, line 67, change "yon" to -- von --.

Signed and Sealed this

Eleventh Day of July, 2000

Attest:

Q. TODD DICKINSON

*Attesting Officer*   *Director of Patents and Trademarks*